(12) United States Patent
Shen et al.

(10) Patent No.: US 11,131,825 B2
(45) Date of Patent: Sep. 28, 2021

(54) OPTICAL ELEMENT DRIVING MECHANISM

(71) Applicant: TDK TAIWAN CORP., Taoyuan (TW)

(72) Inventors: Wei-Jhe Shen, Taoyuan (TW);
Chih-Shiang Wu, Taoyuan (TW);
Sin-Jhong Song, Taoyuan (TW);
Che-Hsiang Chiu, Taoyuan (TW);
Fu-Yuan Wu, Taoyuan (TW);
Sheng-Chang Lin, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 0 days.

(21) Appl. No.: 16/900,490

(22) Filed: Jun. 12, 2020

(65) Prior Publication Data

US 2020/0393634 A1 Dec. 17, 2020

Related U.S. Application Data

(60) Provisional application No. 62/861,440, filed on Jun. 14, 2019.

(51) Int. Cl.
| | |
|---|---|
| *G02B 7/00* | (2021.01) |
| *H04N 5/232* | (2006.01) |
| *G03B 5/04* | (2021.01) |
| *G02B 7/04* | (2021.01) |
| *G02B 27/64* | (2006.01) |

(Continued)

(52) U.S. Cl.
CPC .............. *G02B 7/005* (2013.01); *G02B 7/04* (2013.01); *G02B 7/09* (2013.01); *G02B 26/02* (2013.01); *G02B 27/646* (2013.01); *G03B 5/04* (2013.01); *G03B 13/36* (2013.01); *H02K 11/21* (2016.01); *H04N 5/2252* (2013.01); *H04N 5/2254* (2013.01); *H04N 5/2257* (2013.01);

(Continued)

(58) Field of Classification Search
None
See application file for complete search history.

(56) References Cited

U.S. PATENT DOCUMENTS

| | | | |
|---|---|---|---|
| 6,519,100 B1 * | 2/2003 | Tanaka | G11B 7/0935 359/824 |
| 2009/0278978 A1 * | 11/2009 | Suzuki | G02B 7/08 348/345 |

(Continued)

FOREIGN PATENT DOCUMENTS

CN 111522118 A 8/2020

OTHER PUBLICATIONS

Office Action dated Dec. 9, 2020 in CN Application No. 202021089912.8 (2 pages).

*Primary Examiner* — William B Perkey
(74) *Attorney, Agent, or Firm* — Muncy, Geissler, Olds & Lowe, P.C.

(57) ABSTRACT

An optical element driving mechanism is provided that includes a fixed assembly, a movable assembly, a driving assembly, and a circuit assembly. The movable assembly is configured to be connected to an optical element, and the movable assembly is movable relative to the fixed assembly. The driving assembly is configured to drive the movable member to move relative to the fixed assembly. The circuit assembly is electrically connected to the driving assembly, and the circuit assembly includes an electrical connection element having a resin material.

18 Claims, 19 Drawing Sheets

(51) Int. Cl.
   *H02K 11/21*   (2016.01)
   *G02B 7/09*    (2021.01)
   *H04N 5/225*   (2006.01)
   *G02B 26/02*   (2006.01)
   *G03B 13/36*   (2021.01)

(52) U.S. Cl.
   CPC ..... *H04N 5/232* (2013.01); *G03B 2205/0053* (2013.01); *G03B 2205/0069* (2013.01)

(56) References Cited

U.S. PATENT DOCUMENTS

| | | | | |
|---|---|---|---|---|
| 2014/0362243 A1* | 12/2014 | Han | ................... | H04N 5/23287 |
| | | | | 348/208.12 |
| 2019/0141224 A1* | 5/2019 | Park | .................. | H01L 27/14636 |
| 2019/0191063 A1* | 6/2019 | Wei | ...................... | H04N 5/2257 |
| 2020/0033699 A1* | 1/2020 | Kim | ......................... | G02B 7/08 |
| 2020/0393634 A1* | 12/2020 | Shen | ........................ | G02B 7/09 |
| 2020/0393642 A1* | 12/2020 | Hu | .......................... | G02B 7/09 |

\* cited by examiner

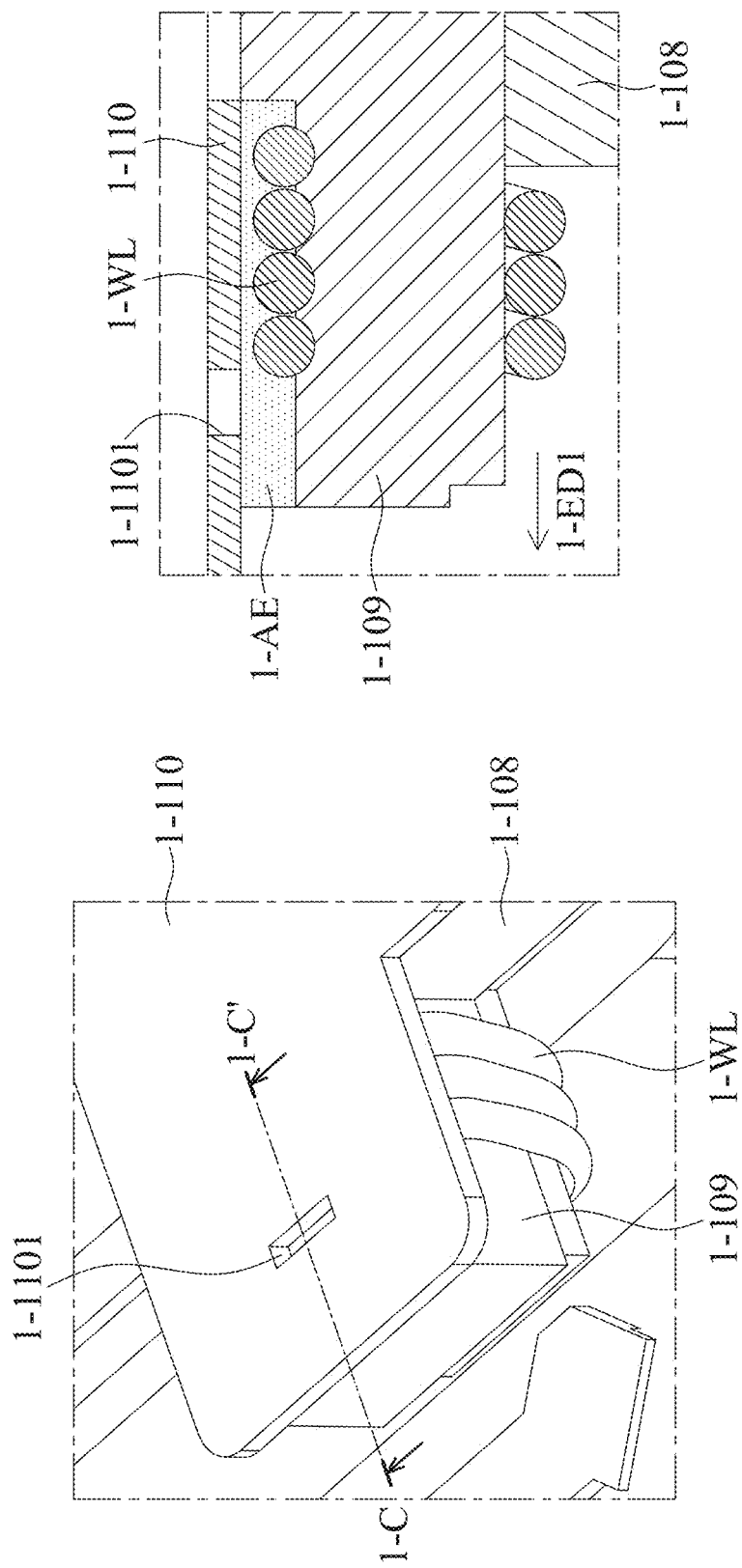

OPTICAL ELEMENT DRIVING MECHANISM

CROSS REFERENCE TO RELATED APPLICATIONS

This application claims the benefit of U.S. Provisional Application No. 62/861,440, filed Jun. 14, 2019, the entirety of which is incorporated by reference herein.

BACKGROUND OF THE DISCLOSURE

Field of the Disclosure

The present disclosure relates to an optical element driving mechanism, and in particular it relates to an optical element driving mechanism having conductive glue.

Description of the Related Art

The rapid development of technology means that many of today's electronic devices (such as smartphones) have camera or video functionality. Using the camera modules disposed in electronic devices, users can operate their electronic devices to capture photographs and record video.

Today's designs for electronic devices continue to follow the trend of miniaturization, meaning that the various components of a camera module and its structure must be continuously reduced in size, so as to achieve miniaturization. In general, a driving mechanism in a camera module has a camera lens holder that is configured to hold a camera lens, and the driving mechanism can have the functions of auto focusing or optical image stabilization. However, although the existing driving mechanism can achieve the aforementioned functions of photographing and video recording, they still cannot meet all users' needs.

Therefore, how to design a camera module that can perform autofocus, optical image stabilization and achieve miniaturization is a topic nowadays that needs to be discussed and solved.

BRIEF SUMMARY OF THE DISCLOSURE

One objective of the present disclosure is to provide an optical element driving mechanism to solve the problems described above.

According to some embodiments of the disclosure, an optical element driving mechanism is provided and includes a fixed assembly, a movable assembly, a driving assembly and a circuit assembly. The movable assembly is configured to be connected to an optical element, and the movable assembly is movable relative to the fixed assembly. The driving assembly is configured to drive the movable member to move relative to the fixed assembly. The circuit assembly is electrically connected to the driving assembly, and the circuit assembly includes an electrical connection element having a resin material.

According to some embodiments, the movable assembly includes a winding member and a metal assembly, the driving assembly includes a driving coil, a leading wire of the driving coil is disposed on a winding member surface of the winding member, and the electrical connection element is disposed between the metal assembly and the winding member.

According to some embodiments, the metal assembly has a plate-shaped structure and defines an extending direction, wherein when viewed in a direction perpendicular to the extending direction, at least 80% of the total area of the winding member surface is covered by the metal assembly.

According to some embodiments, the winding member further has a glue receiving groove formed by the winding member surface, and the glue receiving groove is configured to receive at least part of the electrical connection element.

According to some embodiments, the winding member has two side walls, the glue receiving groove is formed between the two side walls, and a plurality of positioning grooves is formed on the two side walls and is configured to position the leading wire.

According to some embodiments, the movable assembly further includes a movable assembly surface which is not parallel to the winding member surface, and the electrical connection element is in direct contact with the movable assembly surface.

According to some embodiments, an extending direction of the winding member is parallel to an extending direction of the metal assembly.

According to some embodiments, the movable assembly further includes a glue receiving groove configured to receive at least part of the electrical connection element, and the glue receiving groove is connected to the winding member.

According to some embodiments, the winding member has a blocking wall configured to limit movement of the electrical connection element in an extending direction of the winding member.

According to some embodiments, the metal assembly has a plate-shaped structure, the plate-shaped structure has an extending direction, and the metal assembly has a through hole, wherein when viewed in a direction perpendicular to the extending direction, the electrical connection element and part of the winding member are seen through the through hole.

According to some embodiments, the movable assembly includes a groove and a concave groove, the groove is connected to the winding member and configured to accommodate the leading wire, the concave groove is disposed in the groove and configured to accommodate the electrical connection element, wherein the groove and the concave groove have different depths.

According to some embodiments, a depth of the concave groove is greater than a depth of the groove.

According to some embodiments, the groove further has a bending receiving portion, part of the leading wire is located at the bending receiving portion, the bending receiving portion has a corner structure, and the leading wire located at the corner structure has an insulating layer.

According to some embodiments, the optical element driving mechanism further includes a protruding post disposed on the movable assembly, the driving assembly includes a driving coil, the driving coil has a winding axis, and a leading wire of the driving coil is wound on the protruding post. The protruding post extends in a direction parallel to the winding axis of the driving coil.

According to some embodiments, the movable assembly includes a groove and a concave groove, the groove is configured to accommodate the leading wire, and the concave groove is disposed in the groove and is configured to accommodate the electrical connection element, wherein the protruding post is not disposed in the concave groove.

According to some embodiments, the movable assembly includes a groove and a concave groove, the groove is configured to accommodate the leading wire, and the concave groove is disposed in the groove and is configured to accommodate the electrical connection element, wherein the protruding post is disposed in the concave groove.

According to some embodiments, the concave groove is formed by a side wall of the movable assembly, and the protruding post is disposed adjacent to the side wall.

According to some embodiments, the movable assembly includes a metal assembly configured to be riveted to the protruding post after the electrical connection element is disposed in the concave groove.

According to some embodiments, the optical element defines an optical axis, when viewed in a direction perpendicular to the optical axis, the protruding post is located between the metal assembly and the movable assembly, and when viewed along the optical axis, the protruding post overlaps at least part of the movable assembly and overlaps at least part of the metal assembly.

According to some embodiments, when viewed in the direction perpendicular to the optical axis, the protruding post is covered by the movable assembly without being exposed, and when viewed along the optical axis, the protruding post is covered by the metal assembly without being exposed.

The present disclosure provides an optical element driving mechanism. In some embodiments, two winding members may be disposed on the lens holder and may serve as an initial end and a finished end of the driving coil, respectively. After the leading wire of the driving coil is wound around the two winding members, the electrical connection element can be disposed between the winding members and the second elastic member, so that the leading wire is electrically connected to the second elastic member.

Based on the structural design of the present disclosure, in the manufacturing process of the optical element driving mechanism, the electrical connection element can be automatically set to achieve the electrical connection, and there is no need to connect the leading wire and the second elastic member by welding through the operator, so that the purpose of reducing process complexity and improving process efficiency can be achieved.

Additional features and advantages of the disclosure will be set forth in the description which follows, and, in part, will be obvious from the description, or can be learned by practice of the principles disclosed herein. The features and advantages of the disclosure can be realized and obtained by means of the instruments and combinations pointed out in the appended claims. These and other features of the disclosure will become more fully apparent from the following description and appended claims, or can be learned by the practice of the principles set forth herein.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 14 is a schematic diagram of a partial structure of the lens holder 1-108 according to another embodiment of the present disclosure.

FIG. 15 is a cross-sectional view along the line 1-C-1-C' in FIG. 14 according to another embodiment of the present disclosure.

DETAILED DESCRIPTION OF THE ILLUSTRATIVE EMBODIMENTS

Figure 1:
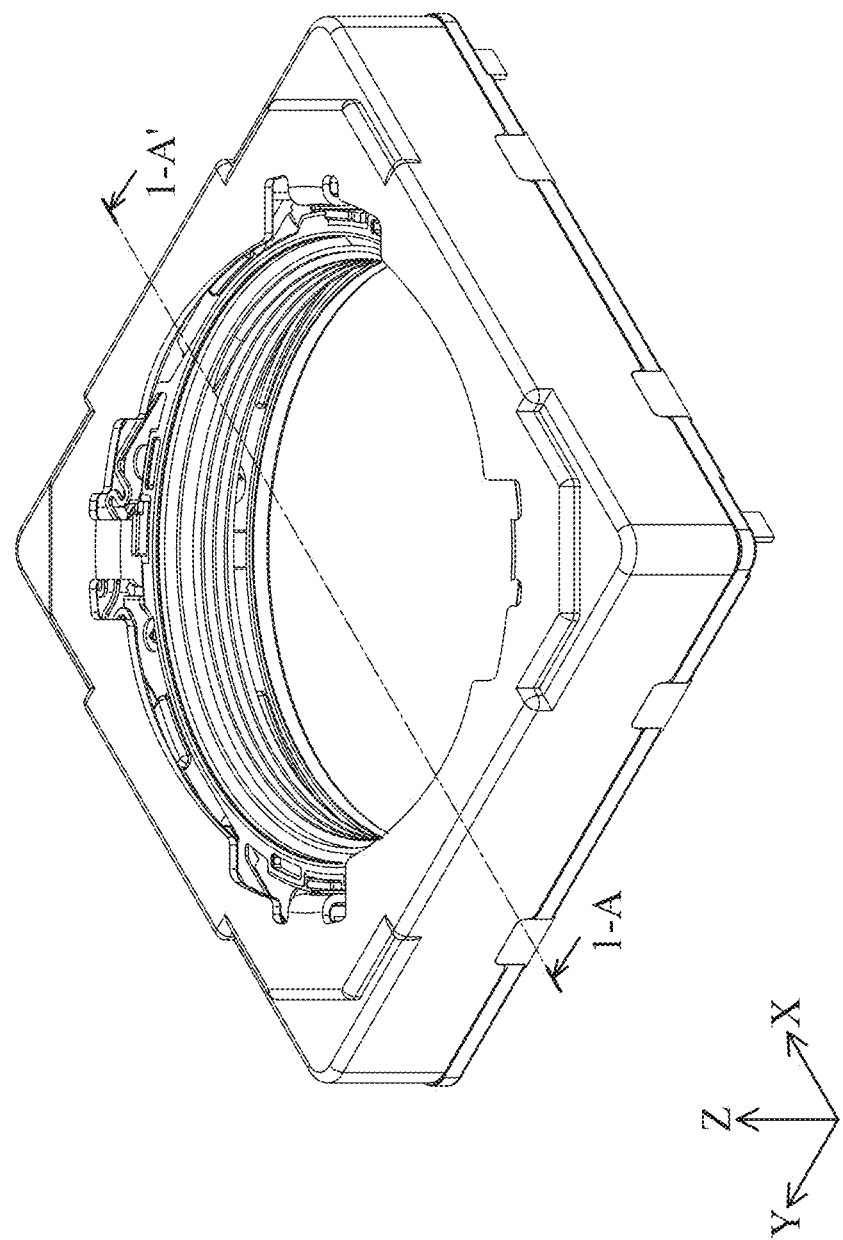
FIG. 1 is a schematic diagram of an optical element driving mechanism 1-100 according to an embodiment of the present disclosure.

In the following detailed description, for the purposes of explanation, numerous specific details and embodiments are set forth in order to provide a thorough understanding of the present disclosure. The specific elements and configurations described in the following detailed description are set forth in order to clearly describe the present disclosure. It will be apparent, however, that the exemplary embodiments set forth herein are used merely for the purpose of illustration, and the inventive concept can be embodied in various forms without being limited to those exemplary embodiments. In addition, the drawings of different embodiments can use like and/or corresponding numerals to denote like and/or corresponding elements in order to clearly describe the present disclosure. However, the use of like and/or corresponding numerals in the drawings of different embodiments does not suggest any correlation between different embodiments. The directional terms, such as "up", "down", "left", "right", "front" or "rear", are reference directions for accompanying drawings. Therefore, using the directional terms is for description instead of limiting the disclosure.

In this specification, relative expressions are used. For example, "lower", "bottom", "higher" or "top" are used to describe the position of one element relative to another. It should be appreciated that if a device is flipped upside down, an element at a "lower" side will become an element at a "higher" side.

The terms "about" and "substantially" typically mean +/−20% of the stated value, more typically +/−10% of the stated value and even more typically +/−5% of the stated value. The stated value of the present disclosure is an approximate value. When there is no specific description, the stated value includes the meaning of "about" or "substantially".

Figure 2:
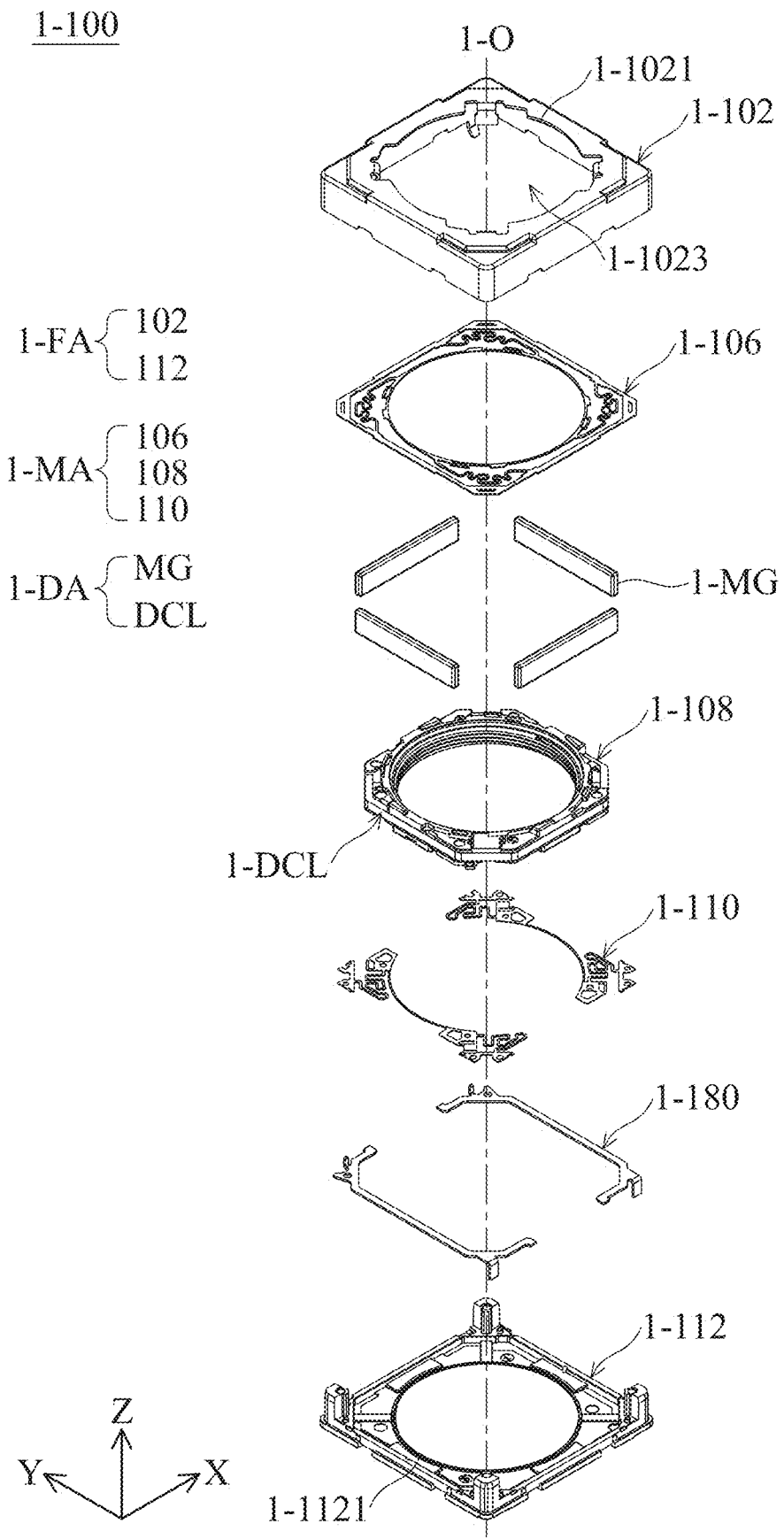
FIG. 2 is an exploded diagram of the optical element driving mechanism 1-100 according to an embodiment of the present disclosure.
Figure 3:
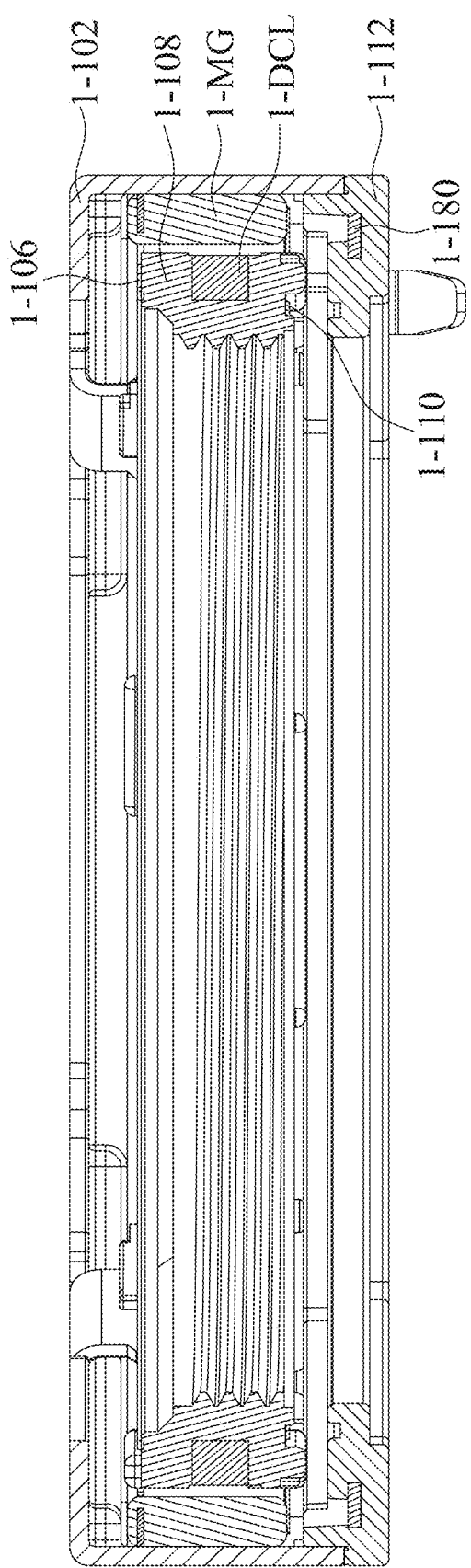
FIG. 3 is a cross-sectional view of the optical element driving mechanism 1-100 along line 1-A-1-A' in FIG. 3 according to an embodiment of the present disclosure.

Please refer to FIG. 1 to FIG. 3. FIG. 1 is a schematic diagram of an optical element driving mechanism 1-100 according to an embodiment of the present disclosure. FIG. 2 is an exploded diagram of the optical element driving mechanism 1-100 according to an embodiment of the present disclosure, and FIG. 3 is a cross-sectional view of the optical element driving mechanism 1-100 along line 1-A-1-A' in FIG. 3 according to an embodiment of the present disclosure. The optical element driving mechanism 1-100 can be an optical camera module configured to hold an optical element. The optical element driving mechanism 1-100 can be installed in various electronic devices or portable electronic devices, such as a smartphone, for allowing a user to perform the image capturing function. In this embodiment, the optical element driving mechanism 1-100 can be a voice coil motor (VCM) with an auto-focusing (AF) function, but it is not limited thereto. In other embodiments, the optical element driving mechanism 1-100 can also perform the functions of auto-focusing and optical image stabilization (OIS).

In the present embodiment, the optical element driving mechanism 1-100 can include a fixed assembly 1-FA, a movable assembly 1-MA, and a driving assembly 1-DA. The movable assembly 1-MA is movably connected to the fixed assembly 1-FA, and the movable assembly 1-MA is configured to hold the optical element (not shown in the figures). The driving assembly 1-DA is configured to drive the movable assembly 1-MA to move relative to the fixed assembly 1-FA.

In this embodiment, as shown in FIG. 2, the fixed assembly 1-FA includes a casing 1-102 and a base 1-112. The movable assembly 1-MA includes a lens holder 1-108 and the aforementioned optical element, and the lens holder 1-108 is configured to hold the optical element.

As shown in FIG. 2, the casing 1-102 has a hollow structure, and a casing opening 1-1021 is formed thereon, and a base opening 1-1121 is formed on the base 1-112. The center of the casing opening 1-1021 corresponds to the optical axis 1-O of the optical element, and the base opening 1-1121 corresponds to a photosensitive element (not shown) disposed under the base 1-112. The external light can enter the casing 1-102 from the casing opening 1-1021 to be received by the photosensitive element after passing through the optical element and the base opening 1-1121 so as to generate a digital image signal.

Furthermore, the casing 1-102 is disposed on the base 1-112 and may have an accommodating space 1-1023 for accommodating the movable assembly 1-MA (including the aforementioned optical element and the lens holder 1-108) and the driving assembly 1-DA.

The movable assembly 1-MA may further include a first elastic member 1-106 and a second elastic member 1-110. The outer portion (the outer ring portion) of the first elastic member 1-106 is fixed to an inner wall surface of the casing 1-102, the outer portion (the outer ring portion) of the second elastic member 1-110 is fixed to the base 1-112, and the inner portions (the inner ring portions) of the first elastic member 1-106 and the second elastic member 1-110 are respectively connected to the upper and lower sides of the lens holder 1-108, so that the lens holder 1-108 can be suspended in the accommodating space 1-1023.

In this embodiment, the driving assembly 1-DA may include a plurality of driving magnets 1-MG and a driving coil 1-DCL. The driving coil 1-DCL is disposed on the lens holder 1-108, and the plurality of driving magnets 1-MG respectively correspond to the driving coil 1-DCL and are disposed on the inner wall surface of the casing 1-102.

In this embodiment, the driving coil 1-DCL may be a wound coil and be disposed on the lens holder 1-108, and a winding axis of the driving coil 1-DCL may be parallel to the optical axis 1-O. When the driving coil 1-DCL is provided with electricity, the driving coil 1-DCL acts with the driving magnets 1-MG to generate an electromagnetic force, so as to drive the lens holder 1-108 and the held optical element to move relative to the base 1-112 along the optical axis 1-O (the Z-axis).

Furthermore, the optical element driving mechanism 1-100 of the present disclosure further includes a circuit assembly 1-180 electrically connected to the driving assembly 1-DA. The circuit assembly 1-180 may be further to be electrically connected to an external circuit, such as a main circuit board of an external electronic device, so that the driving assembly 1-DA can operate according to the signal of the external electronic device.

Furthermore, in this embodiment, the circuit assembly 1-180 is disposed inside the base 1-112. For example, the base 1-112 is made of plastic material, and the circuit assembly 1-180 is formed in the base 1-112 by the molded interconnect device (MID) technology.

Figure 4:
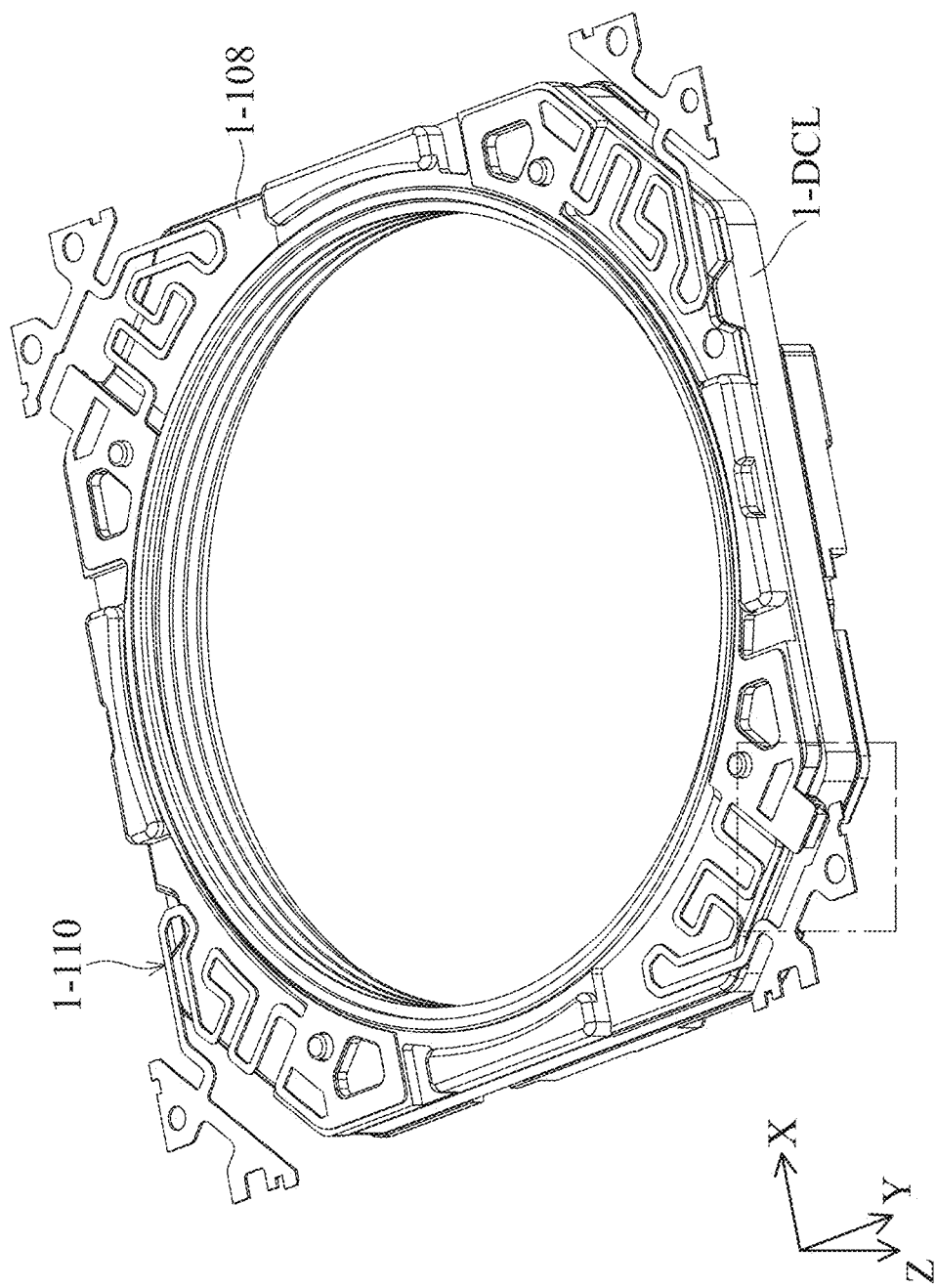
FIG. 4 is a schematic bottom view of the second elastic member 1-110 and the lens holder 1-108 according to an embodiment of the present disclosure.
Figure 5:
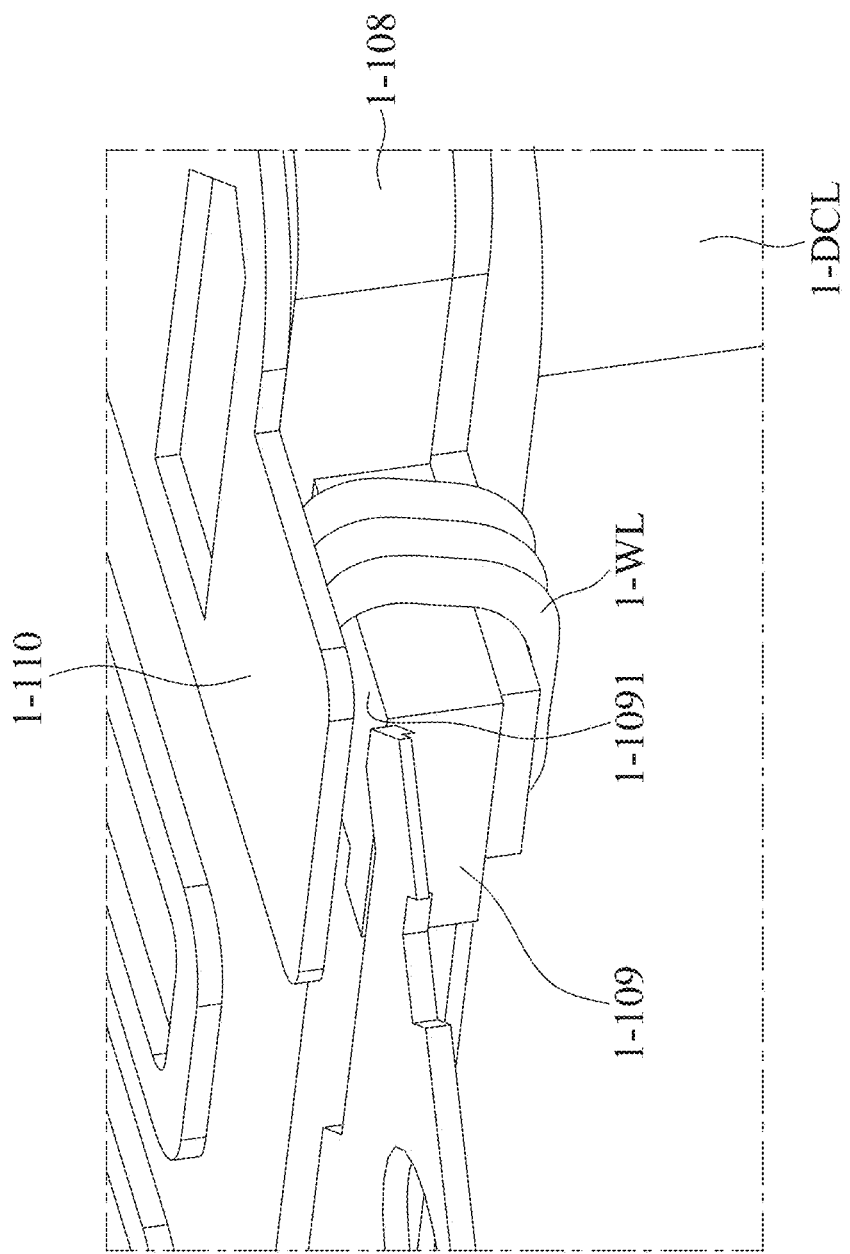
FIG. 5 is a partial enlarged diagram of FIG. 4 according to an embodiment of the present disclosure.
Figures 6, 7:
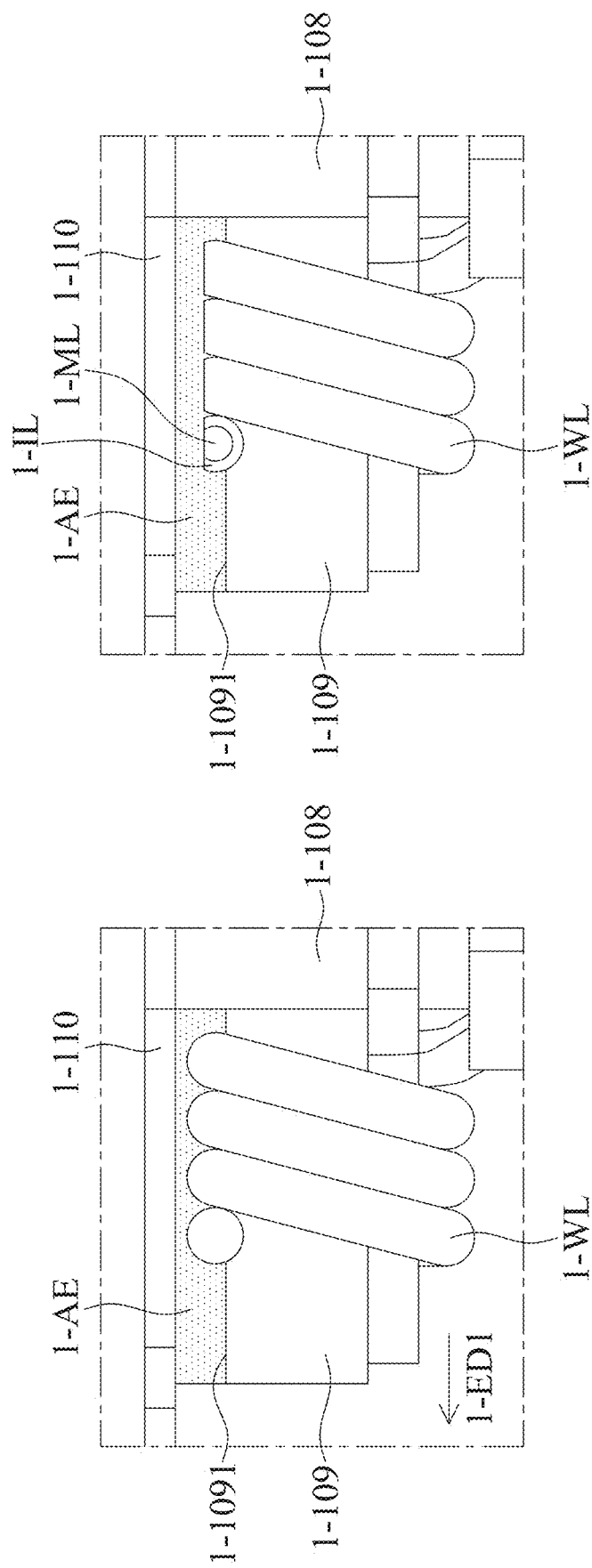
FIG. 6 is a side view of a partial structure of the second elastic member 1-110 and the lens holder 1-108 according to an embodiment of the present disclosure.
FIG. 7 is a side view of a partial structure of the second elastic member 1-110 and the lens holder 1-108 according to another embodiment of the present disclosure.

Please refer to FIG. 4 to FIG. 6. FIG. 4 is a schematic bottom view of the second elastic member 1-110 and the lens holder 1-108 according to an embodiment of the present disclosure, FIG. 5 is a partial enlarged diagram of FIG. 4 according to an embodiment of the present disclosure, and FIG. 6 is a side view of a partial structure of the second elastic member 1-110 and the lens holder 1-108 according to an embodiment of the present disclosure. In this embodiment, the second elastic member 1-110 and the first elastic member 1-106 can be referred to as a metal assembly, the lens holder 1-108 of the movable assembly 1-MA further includes a winding member 1-109, and a leading wire 1-WL of the driving coil 1-DCL is disposed on a winding member surface 1-1091 of the winding member 1-109.

In addition, as shown in FIG. 6, the circuit assembly 1-180 may further include an electrical connection element 1-AE, the electrical connection element 1-AE may be a conductive glue, which may contain a conductive material, for example silver or resin material, but it not limited to. The electrical connection element 1-AE is disposed between the second elastic member 1-110 and the winding member 1-109, so that the driving coil 1-DCL is electrically connected to the second elastic member 1-110 via the leading wire 1-WL.

In this embodiment, as shown in FIG. 4, the second elastic member 1-110 has a plate-shaped structure and defines an extending direction, the extending direction may be parallel to the XY plane, and the extending direction is perpendicular to the optical axis 1-O. When viewed along the optical axis 1-O (the Z-axis), at least 80% of the total area of the winding member surface 1-1091 is covered by the second elastic member 1-110. As shown in FIG. 6, the second elastic member 1-110 covers all the winding member surface 1-1091.

In addition, it is worth noting that an extending direction 1-ED1 of the winding member 1-109 is parallel to an extending direction of the second elastic member 1-110. As shown in FIG. 6, both the winding member 1-109 and the second elastic member 1-110 extend leftward (along the XY plane).

Please refer to FIG. 7, which is a side view of a partial structure of the second elastic member 1-110 and the lens holder 1-108 according to another embodiment of the present disclosure. In this embodiment, the leading wire 1-WL may include a metal layer 1-ML and an insulating layer 1-IL. Before the second elastic member 1-110 is installed on the lens holder 1-108, part of the insulating layer 1-IL can be removed using a laser to expose the metal layer 1-ML, and then the leading wire 1-WL can be electrically connected to the second elastic member 1-110 by the electrical connection element 1-AE. It should be noted that in this embodiment, the laser only removes the insulating layer 1-IL at upper side of the metal layer 1-ML, but in other embodiments, the insulating layer 1-IL at both sides (the upper and lower sides) of the metal layer 1-ML can also be removed.

Figure 8:
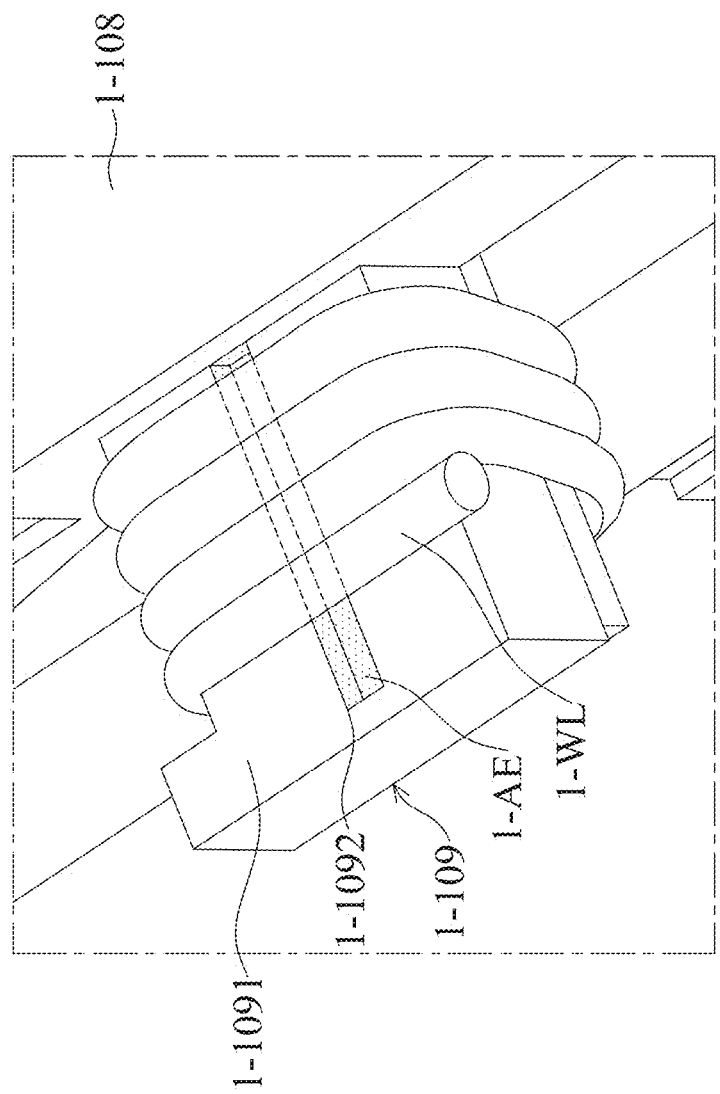
FIG. 8 is a schematic diagram of a partial structure of the lens holder 1-108 according to another embodiment of the present disclosure.

Please refer to FIG. 8, which is a schematic diagram of a partial structure of the lens holder 1-108 according to another embodiment of the present disclosure. In this embodiment, the winding member 1-109 also has a glue receiving groove 1-1092 formed by the winding member surface 1-1091, and the glue receiving groove 1-1092 is configured to receive at least part of the electrical connection element 1-AE. Based on the design of the glue receiving groove 1-1092 of this embodiment, the bonding strength between the winding member 1-109 and the leading wire 1-WL can be increased.

Figure 9:
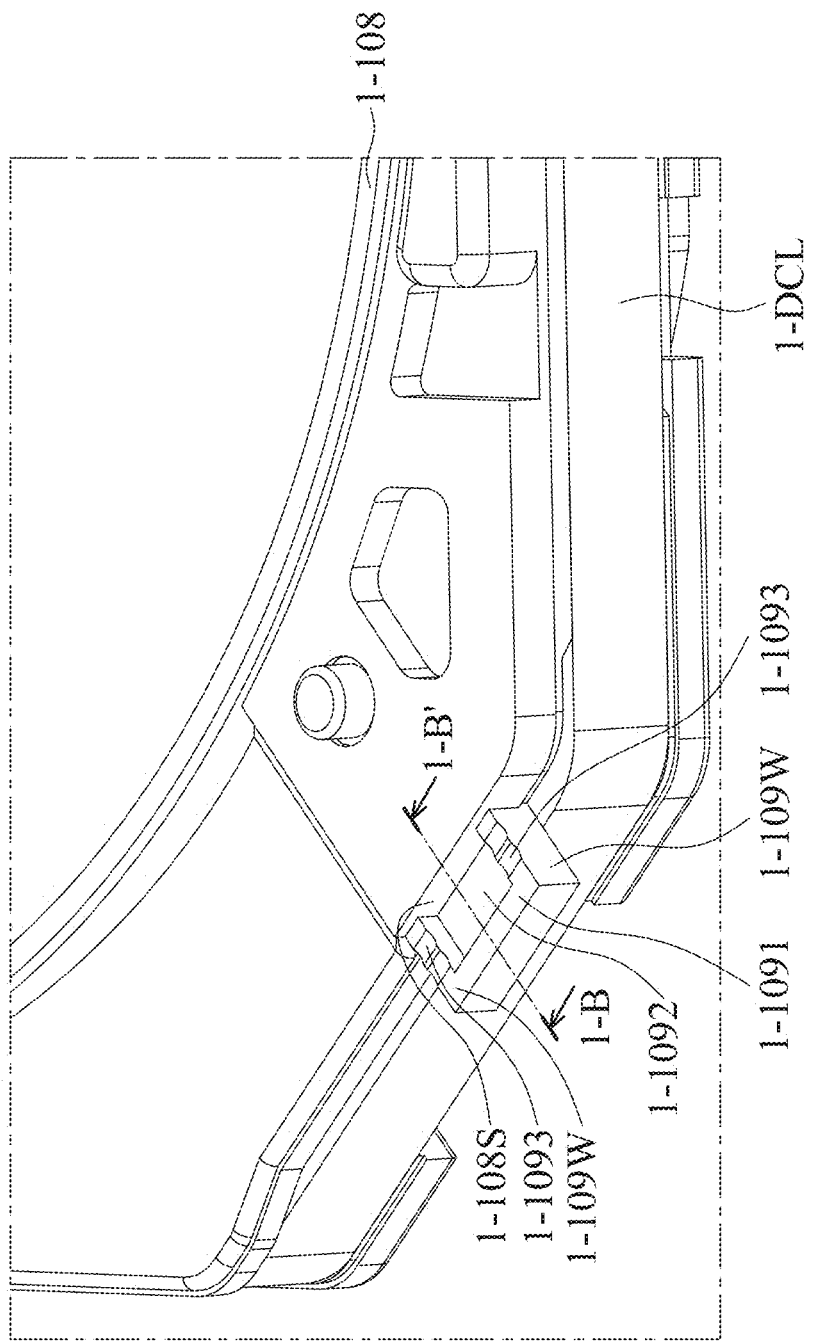
FIG. 9 is a schematic diagram of a partial structure of the lens holder 1-108 according to another embodiment of the present disclosure.

Please refer to FIG. 9, which is a schematic diagram of a partial structure of the lens holder 1-108 according to another embodiment of the present disclosure. In this embodiment, the winding member 1-109 has two side walls 1-109W, and the glue receiving groove 1-1092 is formed between the two side walls 1-109W. A plurality of positioning grooves 1-1093 may be formed on the two side walls 1-109W, for example, formed by the winding member surface 1-1091. These positioning grooves 1-1093 are configured to position the leading wire 1-WL.

Figure 10:
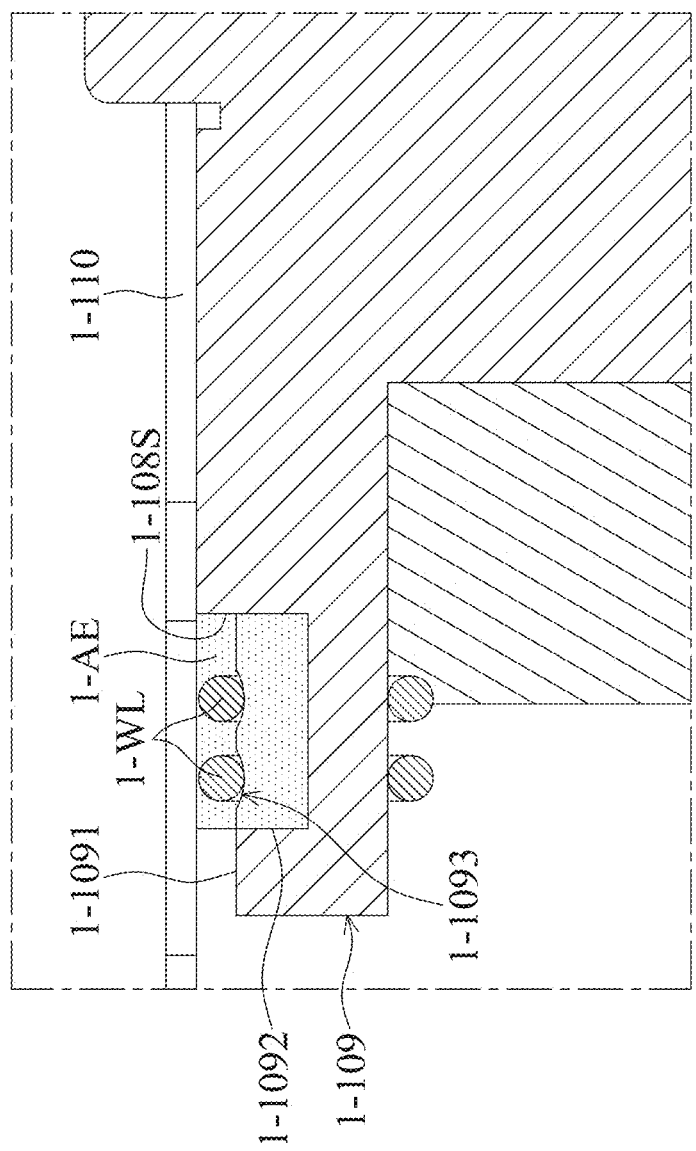
FIG. 10 is a cross-sectional view along line 1-B-1-B' of FIG. 9 according to an embodiment of the present disclosure.

Please refer to FIG. 9 and FIG. 10. FIG. 10 is a cross-sectional view along line 1-B-1-B' of FIG. 9 according to an embodiment of the present disclosure. As shown in FIG. 10, the positioning grooves 1-1093 can separate the two adjacent leading wires 1-WL, so that when the electrical connection element 1-AE is provided, the electrical connection element 1-AE can flow to the glue receiving groove 1-1092 through the gap between the two leading wires 1-WL. Based on the design of the positioning grooves 1-1093 of this embodiment, the adhesive area of the winding member 1-109 and the electrical connection element 1-AE can be increased, thereby increasing the bonding strength.

In addition, as shown in FIG. 9 and FIG. 10, the lens holder 1-108 of the movable assembly 1-MA further includes a movable assembly surface 1-108S, which is not parallel to the winding member surface 1-1091, and the electrical connection element 1-AE is in direct contact with the movable assembly surface 1-108S. That is, the electrical connection element 1-AE can fill up the glue receiving groove 1-1092.

Figure 11:
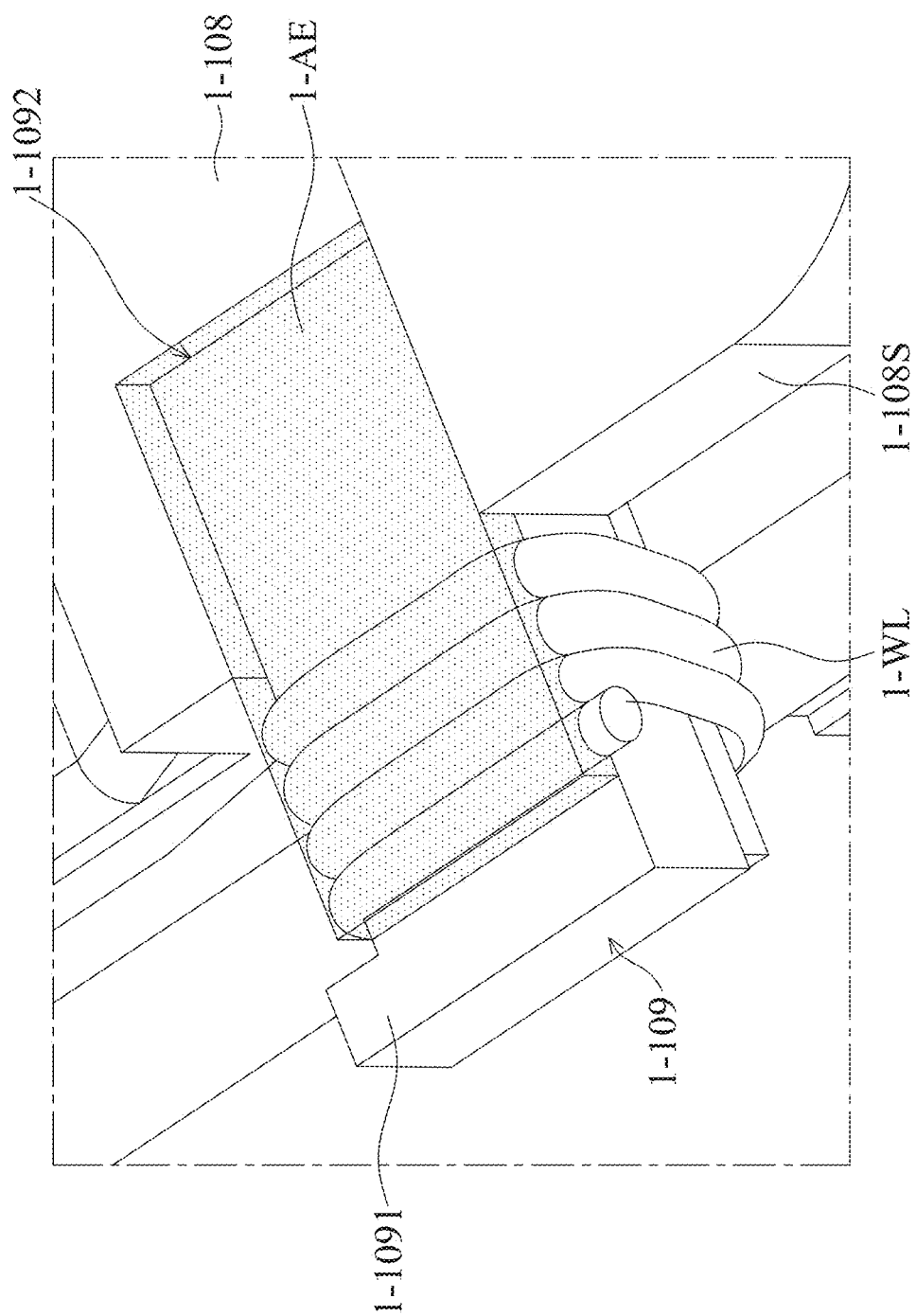
FIG. 11 is a schematic diagram of a partial structure of the lens holder 1-108 according to another embodiment of the present disclosure.

Please refer to FIG. 11, which is a schematic diagram of a partial structure of the lens holder 1-108 according to another embodiment of the present disclosure. As shown in FIG. 11, in this embodiment, the glue receiving groove 1-1092 is formed by the movable assembly surface 1-108S toward the optical axis 1-0, and the glue receiving groove 1-1092 is connected to the winding member 1-109 and configured to receive at least part of the electrical connection element 1-AE. Based on the structural configuration of this embodiment, the contact area of the electrical connection element 1-AE and the leading wire 1-WL can be increased, and the accuracy of setting the electrical connection element 1-AE can be increased.

Figure 12:
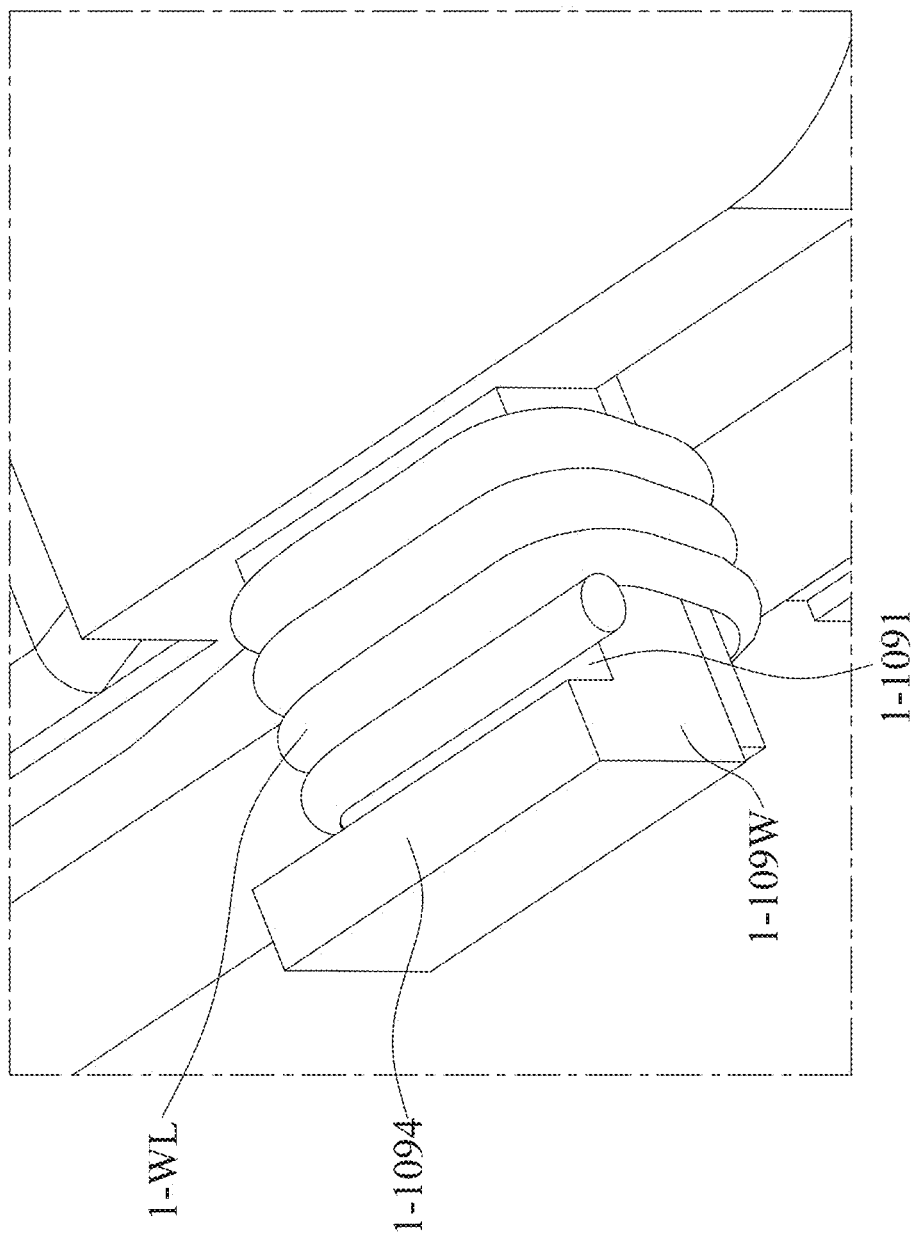
FIG. 12 is a schematic diagram of a partial structure of the lens holder 1-108 according to another embodiment of the present disclosure.
Figure 13:
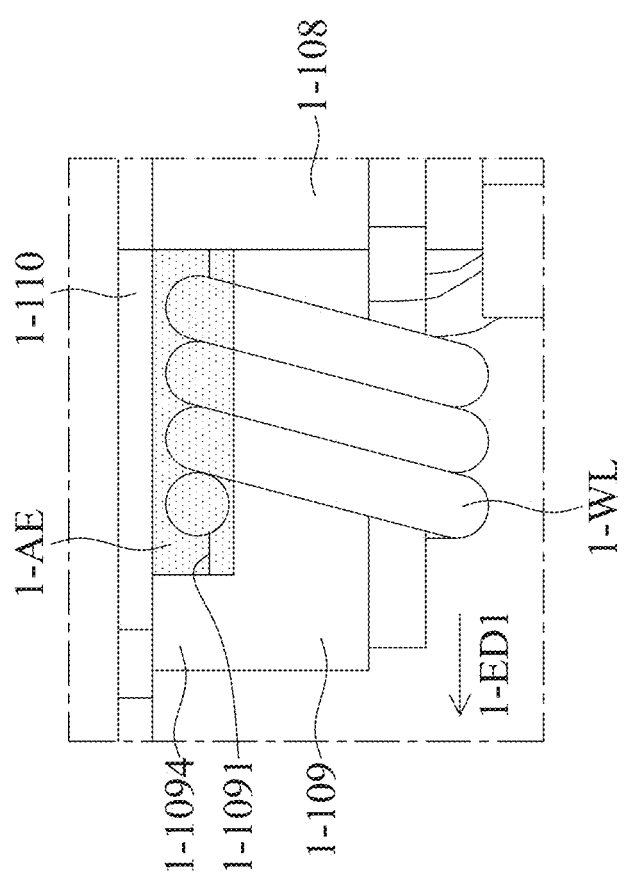
FIG. 13 is a side view of a partial structure of the lens holder 1-108 according to another embodiment of the present disclosure.

Please refer to FIG. 12 and FIG. 13. FIG. 12 is a schematic diagram of a partial structure of the lens holder 1-108 according to another embodiment of the present disclosure, and FIG. 13 is a side view of a partial structure of the lens holder 1-108 according to another embodiment of the present disclosure. In this embodiment, the winding member 1-109 may have a blocking wall 1-1094 protruding from the winding member surface 1-1091. The blocking wall 1-1094 is configured to limit the movement of the electrical connection element 1-AE in the extending direction 1-ED1 of the winding member 1-109.

Based on the structural configuration of this embodiment, the electrical connection element 1-AE can overflow from the winding member surface 1-1091 toward the side walls 1-109W on both sides so as to increase the contact area between the electrical connection element 1-AE and leading wire 1-WL.

Please refer to FIG. 14 and FIG. 15. FIG. 14 is a schematic diagram of a partial structure of the lens holder 1-108 according to another embodiment of the present disclosure, and FIG. 15 is a cross-sectional view along the line 1-C-1-C' in FIG. 14 according to another embodiment of the present disclosure. In this embodiment, the second elastic member 1-110 further has a through hole 1-1101, and when viewed in a direction (such as the Z-axis) perpendicular to the extending direction 1-ED1, the electrical connection element 1-AE and part of the winding member 1-109 can be seen through the through hole 1-1101.

Based on the design of the through hole 1-1101 of the present disclosure, the operator can easily observe the state of connection between the electrical connection element 1-AE and the winding member 1-109 and between the electrical connection element 1-AE and the leading wire 1-WL.

Figure 16:
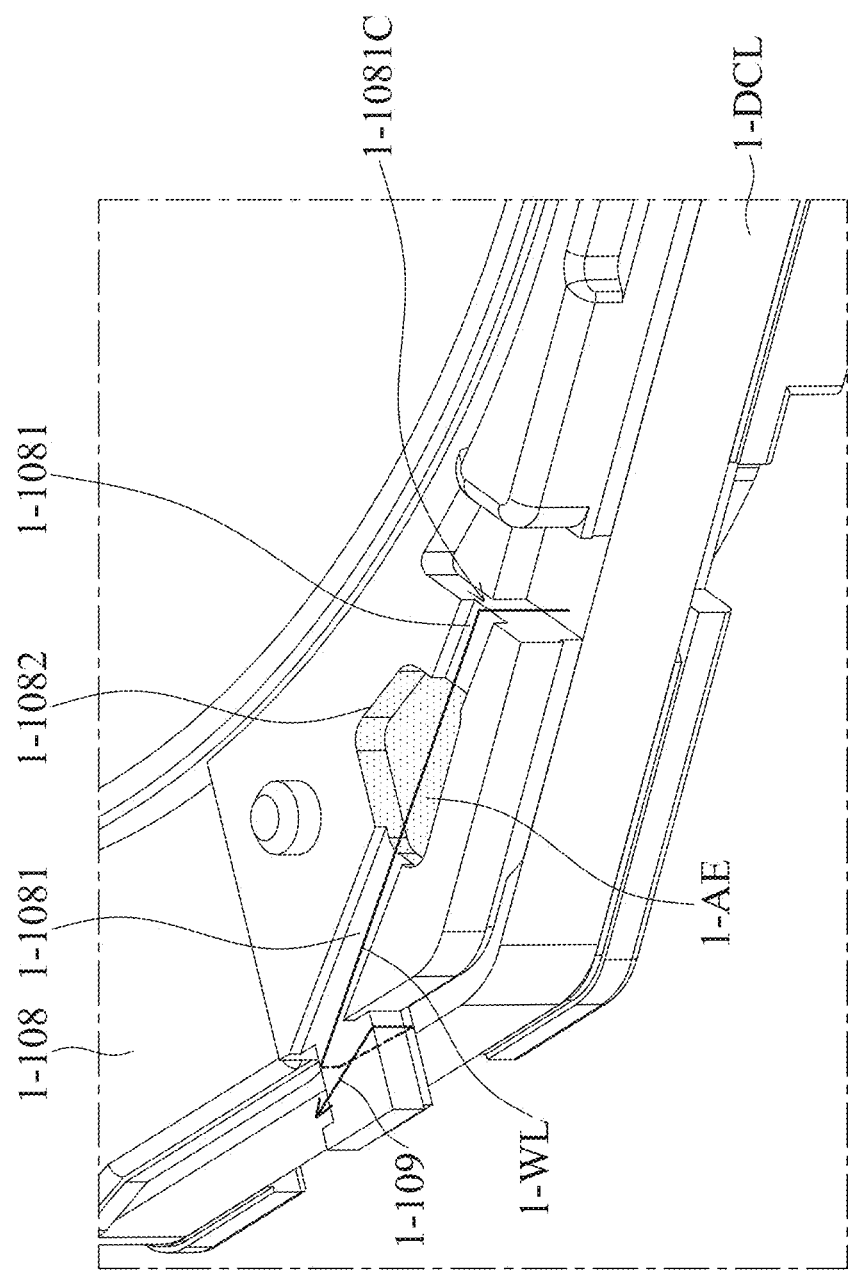
FIG. 16 is a schematic diagram of a partial structure of the lens holder 1-108 according to another embodiment of the present disclosure.

Please refer to FIG. 16, which is a schematic diagram of a partial structure of the lens holder 1-108 according to another embodiment of the present disclosure. In this embodiment, the lens holder 1-108 of the movable assembly 1-MA has a groove 1-1081 and a concave groove 1-1082. The groove 1-1081 is connected to the winding member 1-109 and configured to accommodate the leading wire 1-WL. The winding direction of the leading wire 1-WL can be indicated by the arrow in FIG. 16. The concave groove 1-1082 is disposed in the groove 1-1081 and configured to accommodate the electrical connection element 1-AE, and the groove 1-1081 and the concave groove 1-1082 have different depths. For example, the depth of the concave groove 1-1082 in the Z-axis is greater than the depth of the groove 1-1081, so that the electrical connection element 1-AE can be easily disposed in the concave groove 1-1082.

It is worth noting that, in this embodiment, the insulating layer of the leading wire 1-WL located at (and/or adjacent to) the concave groove 1-1082 is removed, so that the leading wire 1-WL is electrically connected to the second elastic member 1-110 through the electrical connection element 1-AE in the concave groove 1-1082. In this embodiment, the insulating layer of the leading wire 1-WL located on the winding member 1-109 is not removed.

As shown in FIG. 16, the groove 1-1081 further has a bending receiving portion 1-1081C, and part of the leading wire 1-WL is located at the bending receiving portion 1-1081C. Specifically, the bending receiving portion 1-1081C may be a corner structure, and the insulating layer of the leading wire 1-WL on the corner structure is not removed to avoid the problem of easy breakage caused by the bending of the leading wire 1-WL.

Figure 17:
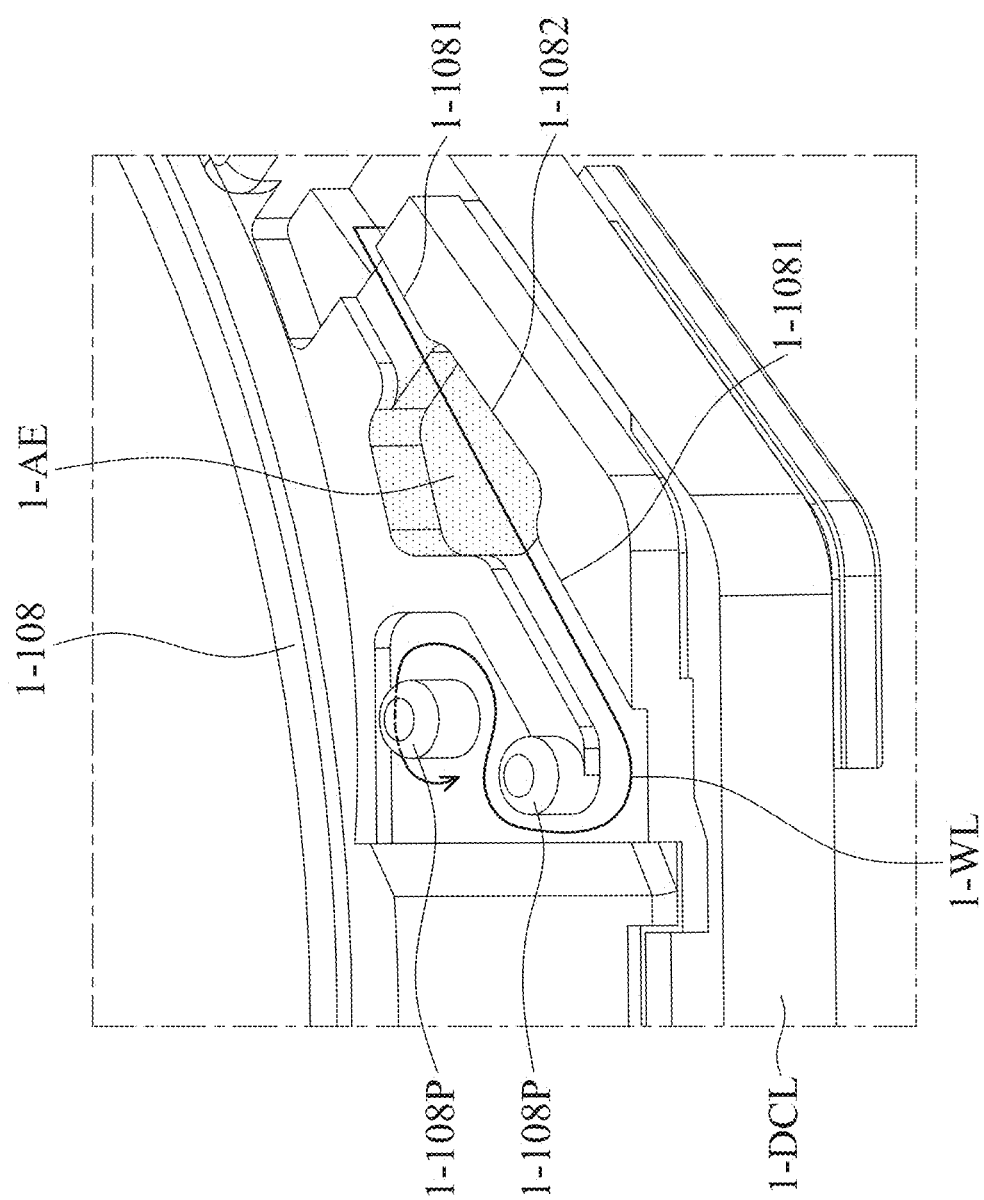
FIG. 17 is a schematic diagram of a partial structure of the lens holder 1-108 according to another embodiment of the present disclosure.

Please refer to FIG. 17, which is a schematic diagram of a partial structure of the lens holder 1-108 according to another embodiment of the present disclosure. In this embodiment, the optical element driving mechanism 1-100 further includes two protruding posts 1-108P, which are disposed on the lens holder 1-108 of the movable assembly 1-MA, and the leading wire 1-WL of the driving coil 1-DCL can be wound on the protruding post 1-108P in a direction of the arrow in FIG. 17. In this embodiment, the protruding post 1-108P extends in a direction (for example, the Z-axis) parallel to a winding axis of the driving coil 1-DCL.

Similar to the previous embodiment, the lens holder 1-108 also has a groove 1-1081 and a concave groove 1-1082. The groove 1-1081 is configured to accommodate the leading wire 1-WL, and the concave groove 1-1082 is disposed in the groove 1-1081 and is configured to accommodate the electrical connection element 1-AE. It is worth noting that the protruding post 1-108P is not disposed in the concave groove 1-1082. Because the winding member 1-109 is omitted, the lens holder 1-108 can be further miniaturized.

The assembly procedure of the lens holder 1-108, the driving coil 1-DCL and the second elastic member 1-110 can be described as follows: winding the leading wire 1-WL around the protruding post 1-108P in the direction of the arrow in FIG. 17, setting the electrical connection element 1-AE in the concave groove 1-1082, then using the protruding posts 1-108P to position the second elastic member 1-110 on the lens holder 1-108, and finally connecting the second elastic member 1-110 to the lens holder 1-108 by hot rivet. After the hot rivet process, the height of the protruding posts 1-108P are decreased.

Figure 18:
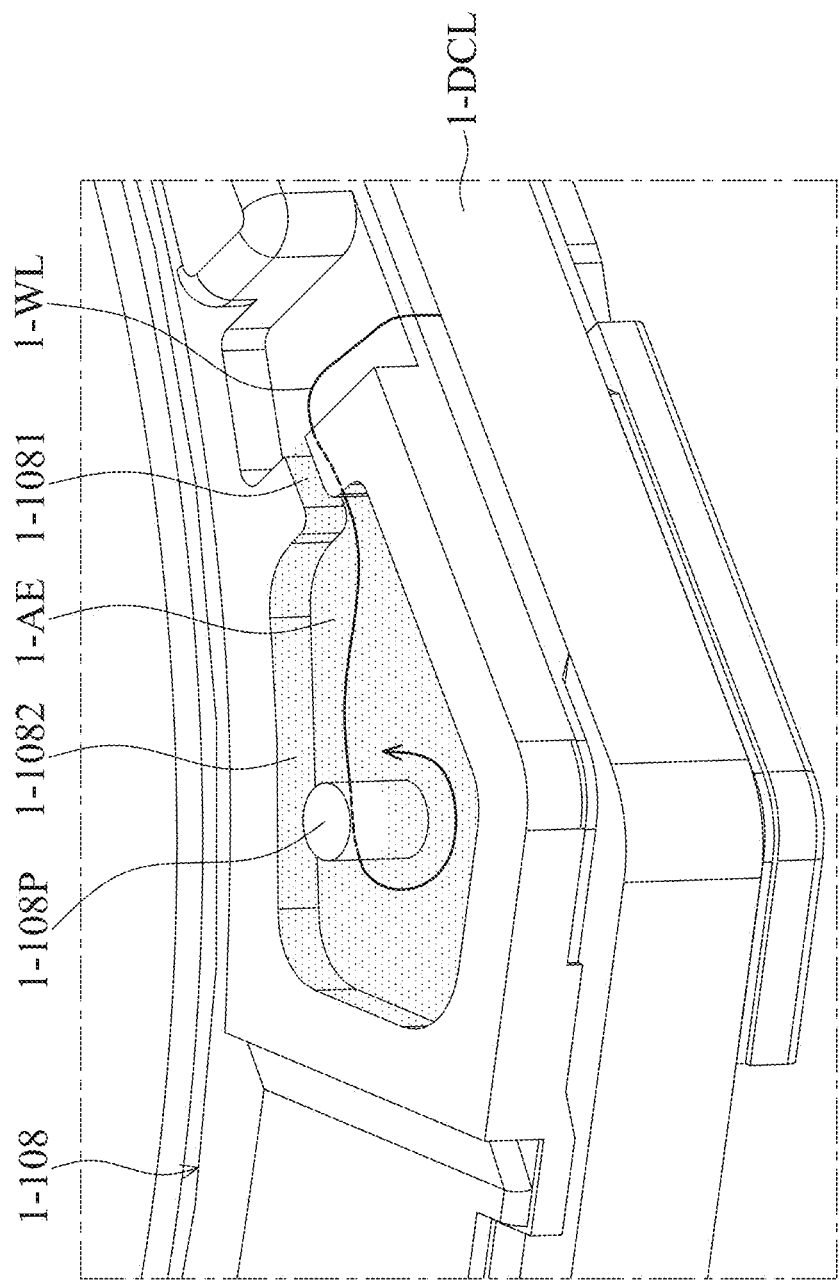
FIG. 18 is a schematic diagram of a partial structure of the lens holder 1-108 according to another embodiment of the present disclosure.

Please refer to FIG. 18, which is a schematic diagram of a partial structure of the lens holder 1-108 according to another embodiment of the present disclosure. Similar to the previous embodiment, the lens holder 1-108 also has a groove 1-1081 and a concave groove 1-1082. The groove 1-1081 is configured to accommodate the leading wire 1-WL, and the concave groove 1-1082 is connected to the groove 1-1081 and configured to accommodate the electrical connection element 1-AE.

Specifically, in this embodiment, the groove 1-1081 and the concave groove 1-1082 may have the same depth, and the protruding post 1-108P is disposed in the concave groove 1-1082. Similar to the previous embodiment, after the hot rivet process, the height of the protruding post 1-108P is reduced, for example, to be approximately equal to the depth of the concave groove 1-1082.

Based on the structural configuration of this embodiment, the electrical connection element 1-AE can be covered by the second elastic member 1-110 without overflowing the concave groove 1-1082, thereby increasing the convenience in the manufacturing process.

Figure 19:
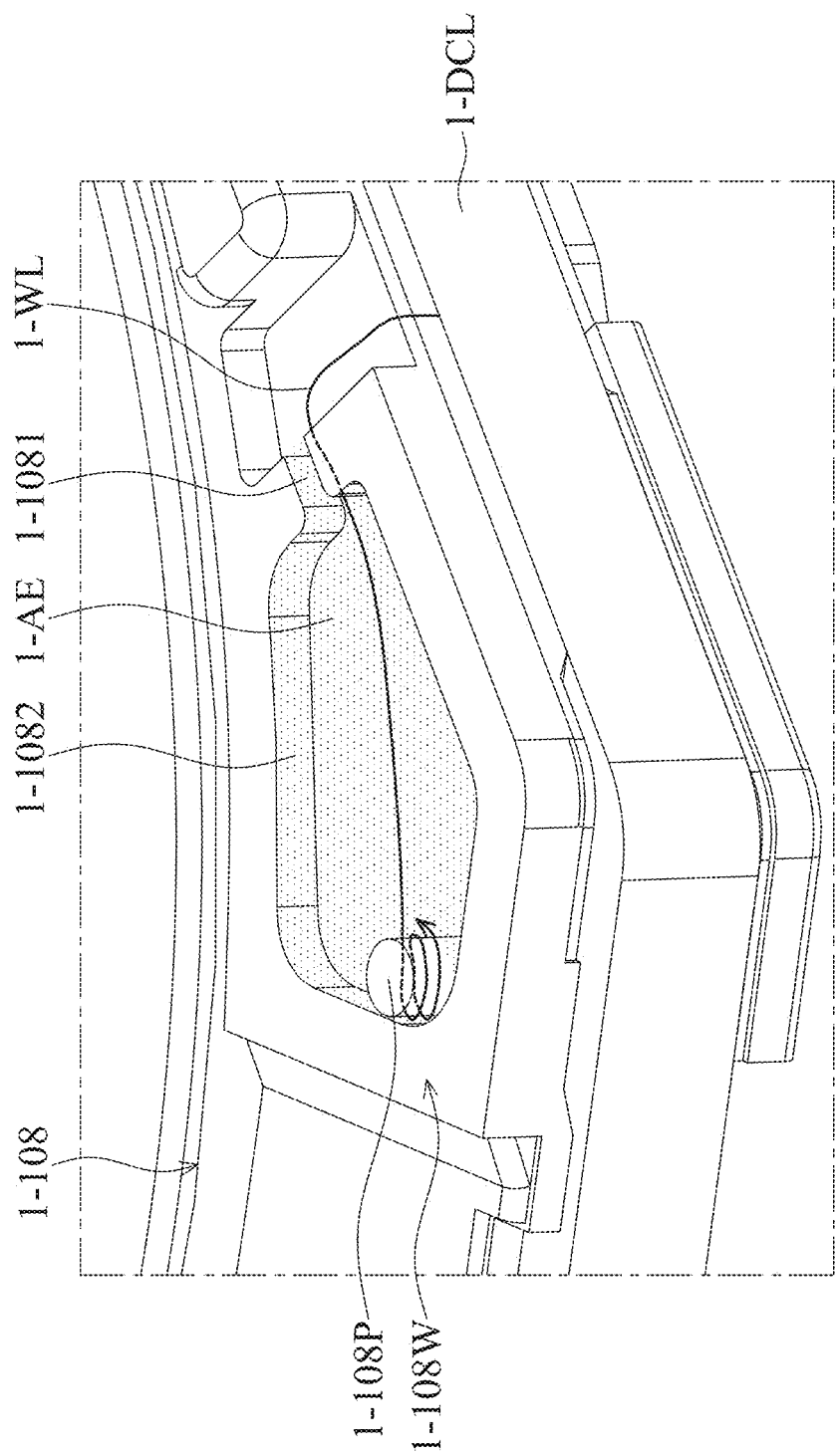
FIG. 19 is a schematic diagram of a partial structure of the lens holder 1-108 according to another embodiment of the present disclosure.

Please refer to FIG. 19, which is a schematic diagram of a partial structure of the lens holder 1-108 according to another embodiment of the present disclosure. In this embodiment, the concave groove 1-1082 is formed by a side wall 1-108W of the lens holder 1-108, and the protruding post 1-108P is disposed adjacent to the side wall 1-108W. Based on the structural configuration of this embodiment, the leading wire 1-WL can be more easily wound on the protruding post 1-108P.

Similar to the foregoing embodiment, the second elastic member 1-110 is thermally riveted to the protruding post 1-108P after the electrical connection element 1-AE is disposed in the concave groove 1-1082. In various embodiments of the present disclosure, the protruding post 1-108P can be configured to position the second elastic member 1-110.

Figure 20:
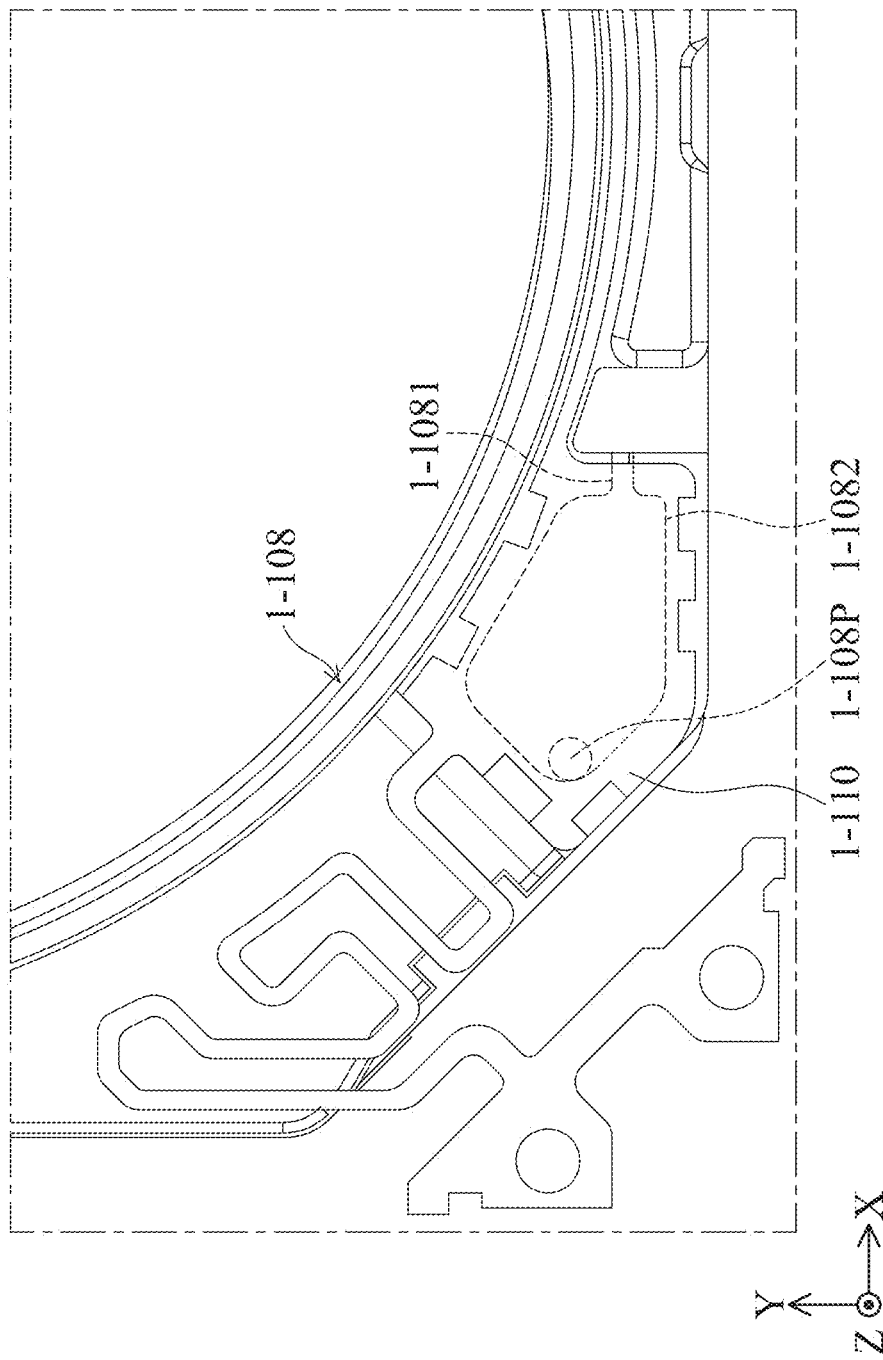
FIG. 20 is a bottom view of the lens holder 1-108 and the second elastic member 1-110 after the process of hot rivet according to another embodiment of the present disclosure.
Figure 21:
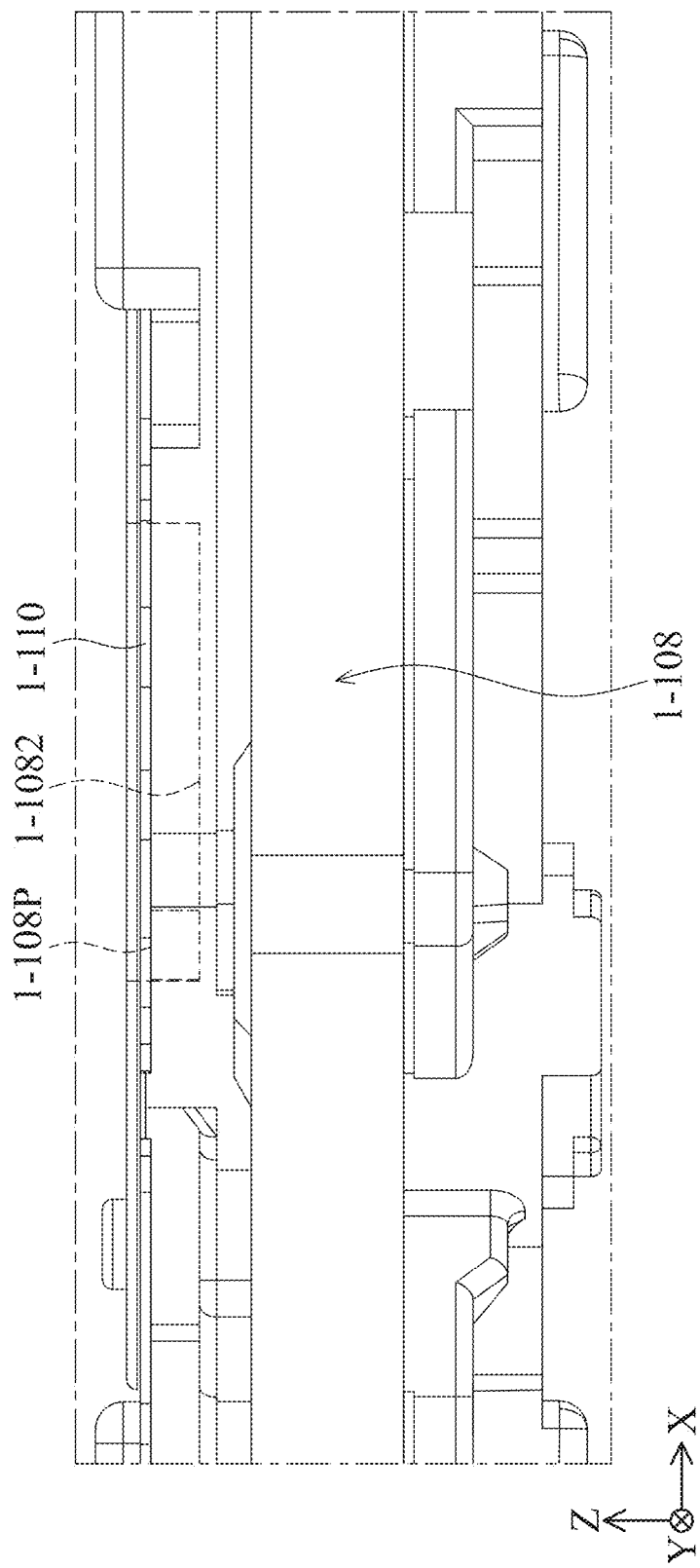
FIG. 21 is a schematic side view of the lens holder 1-108 and the second elastic member 1-110 after the process of hot rivet according to an embodiment of the present disclosure.

Please refer to FIG. 20 and FIG. 21. FIG. 20 is a bottom view of the lens holder 1-108 and the second elastic member 1-110 after the process of hot rivet according to another embodiment of the present disclosure, and FIG. 21 is a schematic side view of the lens holder 1-108 and the second elastic member 1-110 after the process of hot rivet according to an embodiment of the present disclosure. As shown in FIG. 20, when viewed along the optical axis 1-O (the Z-axis), the protruding post 1-108P overlaps at least part of the lens holder 1-108 and overlaps at least part of the second elastic member 1-110. Specifically, the protruding post 1-108P is covered by the second elastic member 1-110 without being exposed.

As shown in FIG. 21, when viewed in a direction (for example, the Y-axis) perpendicular to the optical axis 1-O, the protruding post 1-108P is located between the second elastic member 1-110 and the lens holder 1-108. The protruding post 1-108P is covered by the lens holder 1-108 without being exposed.

The present disclosure provides an optical element driving mechanism 1-100. In some embodiments, two winding members 1-109 may be disposed on the lens holder 1-108 and may serve as an initial end and a finished end of the driving coil 1-DCL, respectively. After the leading wire 1-WL of the driving coil 1-DCL is wound around the two winding members 1-109, the electrical connection element 1-AE can be disposed between the winding members 1-109 and the second elastic member 1-110, so that the leading wire 1-WL is electrically connected to the second elastic member 1-110.

Based on the structural design of the present disclosure, in the manufacturing process of the optical element driving mechanism 1-100, the electrical connection element 1-AE can be automatically set to achieve the electrical connection, and there is no need to connect the leading wire 1-WL and the second elastic member 1-110 by welding through the operator, so that the purpose of reducing process complexity and improving process efficiency can be achieved.

Although the embodiments and their advantages have been described in detail, it should be understood that various changes, substitutions, and alterations can be made herein without departing from the spirit and scope of the embodiments as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein can be utilized according to the disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. An optical element driving mechanism, comprising:
   a fixed assembly;
   a movable assembly, configured to be connected to an optical element, wherein the movable assembly is movable relative to the fixed assembly;
   a driving assembly, configured to drive the movable assembly to move relative to the fixed assembly; and
   a circuit assembly, electrically connected to the driving assembly, wherein the circuit assembly includes an electrical connection element having a resin material;
   wherein the movable assembly includes a winding member and a metal assembly, the driving assembly includes a driving coil, a leading wire of the driving coil is disposed on a winding member surface of the winding member, and the electrical connection element is disposed between the metal assembly and the winding member;
   wherein the metal assembly has a plate-shaped structure and defines an extending direction, wherein when viewed in a direction perpendicular to the extending direction, at least 80% of total area of the winding member surface is covered by the metal assembly.

2. The optical element driving mechanism as claimed in claim 1, wherein the winding member further has a glue receiving groove formed by the winding member surface, and the glue receiving groove is configured to receive at least part of the electrical connection element.

3. The optical element driving mechanism as claimed in claim 2, wherein the winding member has two side walls, the glue receiving groove is formed between the two side walls, and a plurality of positioning grooves is formed on the two side walls and is configured to position the leading wire.

4. The optical element driving mechanism as claimed in claim 2, wherein the movable assembly further includes a movable assembly surface which is not parallel to the winding member surface, and the electrical connection element is in direct contact with the movable assembly surface.

5. The optical element driving mechanism as claimed in claim 1, wherein an extending direction of the winding member is parallel to the extending direction of the metal assembly.

6. An optical element driving mechanism, comprising:
   a fixed assembly;
   a movable assembly, configured to be connected to an optical element, wherein the movable assembly is movable relative to the fixed assembly;
   a driving assembly, configured to drive the movable assembly to move relative to the fixed assembly; and
   a circuit assembly, electrically connected to the driving assembly, wherein the circuit assembly includes an electrical connection element having a resin material;
   wherein the movable assembly includes a winding member and a metal assembly, the driving assembly includes a driving coil, a leading wire of the driving coil is disposed on a winding member surface of the winding member, and the electrical connection element is disposed between the metal assembly and the winding member;
   wherein the movable assembly further includes a glue receiving groove configured to receive at least part of the electrical connection element, and the glue receiving groove is connected to the winding member.

7. The optical element driving mechanism as claimed in claim 1, wherein the winding member has a blocking wall configured to limit movement of the electrical connection element in an extending direction of the winding member.

8. The optical element driving mechanism as claimed in claim 1, wherein the metal assembly has a through hole, wherein when viewed in a direction perpendicular to the extending direction, the electrical connection element and part of the winding member are seen through the through hole.

9. The optical element driving mechanism as claimed in claim 1, wherein the movable assembly includes a groove and a concave groove, the groove is connected to the winding member and configured to accommodate the leading wire, the concave groove is disposed in the groove and configured to accommodate the electrical connection element, wherein the groove and the concave groove have different depths.

10. The optical element driving mechanism as claimed in claim 9, wherein a depth of the concave groove is greater than a depth of the groove.

11. The optical element driving mechanism as claimed in claim 9, wherein the groove further has a bending receiving portion, part of the leading wire is located at the bending receiving portion, the bending receiving portion has a corner structure, and the leading wire located at the corner structure has an insulating layer.

12. An optical element driving mechanism, comprising:
    a fixed assembly;
    a movable assembly, configured to be connected to an optical element, wherein the movable assembly is movable relative to the fixed assembly;
    a driving assembly, configured to drive the movable assembly to move relative to the fixed assembly; and
    a circuit assembly, electrically connected to the driving assembly, wherein the circuit assembly includes an electrical connection element having a resin material;
    wherein the optical element driving mechanism further includes a protruding post disposed on the movable assembly, the driving assembly includes a driving coil, the driving coil has a winding axis, and a leading wire of the driving coil is wound on the protruding post;
    wherein the protruding post extends in a direction parallel to the winding axis of the driving coil.

13. The optical element driving mechanism as claimed in claim 1, wherein the movable assembly includes a groove and a concave groove, the groove is configured to accommodate the leading wire, and the concave groove is disposed in the groove and is configured to accommodate the electrical connection element, wherein the optical element driving mechanism further includes a protruding post, wherein the protruding post is not disposed in the concave groove.

14. The optical element driving mechanism as claimed in claim 1, wherein the movable assembly includes a groove and a concave groove, the groove is configured to accommodate the leading wire, and the concave groove is disposed in the groove and is configured to accommodate the electrical connection element, wherein the optical element driving mechanism further includes a protruding post, wherein the protruding post is disposed in the concave groove.

15. The optical element driving mechanism as claimed in claim 14, wherein the concave groove is formed by a side wall of the movable assembly, and the protruding post is disposed adjacent to the side wall.

16. The optical element driving mechanism as claimed in claim 14, wherein the metal assembly is configured to be riveted to the protruding post after the electrical connection element is disposed in the concave groove.

17. The optical element driving mechanism as claimed in claim 16, wherein the optical element defines an optical axis, when viewed in a direction perpendicular to the optical axis, the protruding post is located between the metal assembly and the movable assembly, and when viewed along the optical axis, the protruding post overlaps at least part of the movable assembly and overlaps at least part of the metal assembly.

18. The optical element driving mechanism as claimed in claim 17, wherein when viewed in the direction perpendicular to the optical axis, the protruding post is covered by the movable assembly without being exposed, and when viewed along the optical axis, the protruding post is covered by the metal assembly without being exposed.

* * * * *